United States Patent [19]

Westervelt et al.

[11] 3,872,712

[45] Mar. 25, 1975

[54] DYNAMIC AIR FLOW COMPARATOR SYSTEM

[75] Inventors: James T. Westervelt, Livonia; Philip E. Swis, Mt. Clemens, both of Mich.

[73] Assignee: The Cross Company, Fraser, Mich.

[22] Filed: Jan. 8, 1973

[21] Appl. No.: 321,691

Related U.S. Application Data

[63] Continuation-in-part of Ser. No. 199,930, Nov. 18, 1971, abandoned.

[52] U.S. Cl. .................................. 73/40, 73/49.2
[51] Int. Cl. ............................................ G01m 3/26
[58] Field of Search ............... 73/40, 49.2, 37, 49.7

[56] References Cited
UNITED STATES PATENTS

| | | |
|---|---|---|
| 2,771,769 | 11/1956 | Nielsen .................................. 73/40 |
| 3,331,237 | 7/1967 | Strang .................................... 73/40 |
| 3,465,562 | 9/1969 | Donohoe ............................... 73/40 |
| 3,691,821 | 9/1972 | Davey .................................. 73/49.2 |

*Primary Examiner*—Richard C. Queisser
*Assistant Examiner*—Joseph W. Roskos
*Attorney, Agent, or Firm*—Harness, Dickey & Pierce

[57] ABSTRACT

A test unit which pre-fills a workpiece with compressed air and then maintains pressure while measuring air flow, in order to quickly detect the rate of leakage. The device measures actual leakage flow and may activate an accept or reject signal or be incorporated with automated equipment. The unit has its own calibration circuit, and computer interfacing is available.

23 Claims, 9 Drawing Figures

DYNAMIC AIR FLOW COMPARATOR SYSTEM

This application is a continuation-in-part of application Ser. No. 199,930 filed Nov. 18, 1971 by the present inventors, and now abandoned.

BACKGROUND OF THE INVENTION

1. Field of the Invention

The invention relates to apparatus for manually or automatically testing workpieces for leakage or the comparison of air flow from a workpiece with a fixed value. Such workpieces may be of many different types, such as transmission housings, power cylinders, parts carrying seals or having fixed orifices, or any of a wide variety of other items. Because of its speed advantage, the present invention is particularly applicable to the field of automated equipment, where parts move between a succession of work stations and are to be leak tested at one or more of these stations without slowing down the production flow.

2. Description of the Prior Art

Heretofore, testing apparatus of this type has included means for pumping a gas such as air into a cavity in the workpiece and then measuring the rate at which pressure in the cavity decays. Variations of this apparatus include differential pressure devices or volumetric meters such as those shown in Strang U.S. Pat. No. 3,331,237, Fournier U.S. Pat. No. 3,359,785 and Donohoe U.S. Pat. No. 3,465,562. One of the major disadvantages of these previous systems is the length of time required to obtain a reading to determine whether leakage is within limits. This drawback has made such devices unsatisfactory for some uses, particularly where automated production lines are involved. Another shortcoming of such previous systems has been that their sensitivity and accuracy varies markedly with temperature changes between workpieces, such changes being influenced by both ambient conditions and the applied gas pressure. The previous systems also lack the reliability which has been exhibited by the present invention over many test cycles.

Leakage detection systems are known using flowmeters, namely Mills et al. U.S. Pat. Nos. 3,625,049 and 3,691,821, Dega U.S. Pat. No. 3,097,521 and Cain et al. U.S. Pat. No. 3,180,135. As will become apparent, however, these systems are quite different in many important respects from the present invention, and do not disclose the combination of pre-fill and test circuits.

Other patents in this general area discovered in a search are:

| | |
|---|---|
| 3,314,283 | R. T. Fitzpatrick et al |
| 3,326,034 | R. T. Fitzpatrick et al |
| 3,360,981 | E. H. Badger |
| 3,360,982 | A. H. Mitchell et al |

BRIEF SUMMARY OF THE INVENTION

The present invention is especially adapted to operate in an industrial environment, furnish leakage test results in an extremely rapid, accurate manner over a wide range of workpiece sizes and flow rates, and to utilize the readings in a variety of ways. The unit is a dynamic leakage flow instrument which measures actual leakage flow rather than a pressure differential or pressure decay. A quick fill circuit pumps air under pressure into the workpiece for a predetermined time until a predetermined pressure is attained. The fill circuit is then closed and, in the first illustrated embodiment, air at a slightly lower controlled pressure is then automatically directed into the workpiece through a separate tester circuit which measures the rate of air flow very accurately. The amount of leakage can thus be determined almost immediately. The flow rate can be read visually and also caused to activate accept or reject indicators or connected to other signals, marking devices, or automated equipment. Computer interfacing may be made available with either BCD (binary coded decimal) or analog output. The unit also has its own calibration circuit for self-checking. In one embodiment, this circuit is automatic so as to recheck the unit after each workpiece is tested.

In a modified form of the device, suitable for detection of very small or micro-leaks, the fill circuit initially pre-charges both the workpiece and a temperature and volume stabilization chamber. The fill circuit is then closed and a gross leak detector circuit of a pressure differential type is connected to the workpiece for detecting large leaks. If the workpiece is acceptable under this test, the stabilization chamber is interconnected with the workpiece throuogh a flowmeter capable of detecting very small rates of flow.

In the case of both the standard and micro-leak units, the outputs of the flowmeters are amplified. In the illustrated embodiment of the standard unit, a pneumatic amplifier is used, whereas an electronic amplifier is utilized in the micro-leak unit.

In a further modification of the standard unit, the quick fill circuit is provided with a bypass which rapidly fills the workpiece at a much higher pressure rate during an initial portion of the pre-filling step. This results in a reduction in cycle time by minimizing the thermal effect of pressurizing the workpieces, especially when testing large parts. This embodiment also differs from the first in that the same pressure regulator is utilized for the final portion of the pre-fill step and the test step.

As illustrated, the unit is a complete package of monocoque construction, self-contained except for air and electrical power supplies, and need only be connected to the part sealing fixture. The system is far less complicated than previous arrangements for this purpose and may be utilized by an operator with no special training.

BRIEF DESCRIPTION OF THE DRAWINGS

FIG. 3 is a schematic flow diagram of the system;

FIG. 9 is a schematic pneumatic-electrical diagram of another modification of the invention having an extremely rapid pre-fill step and a single pressure regulator for both the final portion of the pre-fill step and the test step.

DESCRIPTION OF THE PREFERRED EMBODIMENTS

Figures 1, 2:
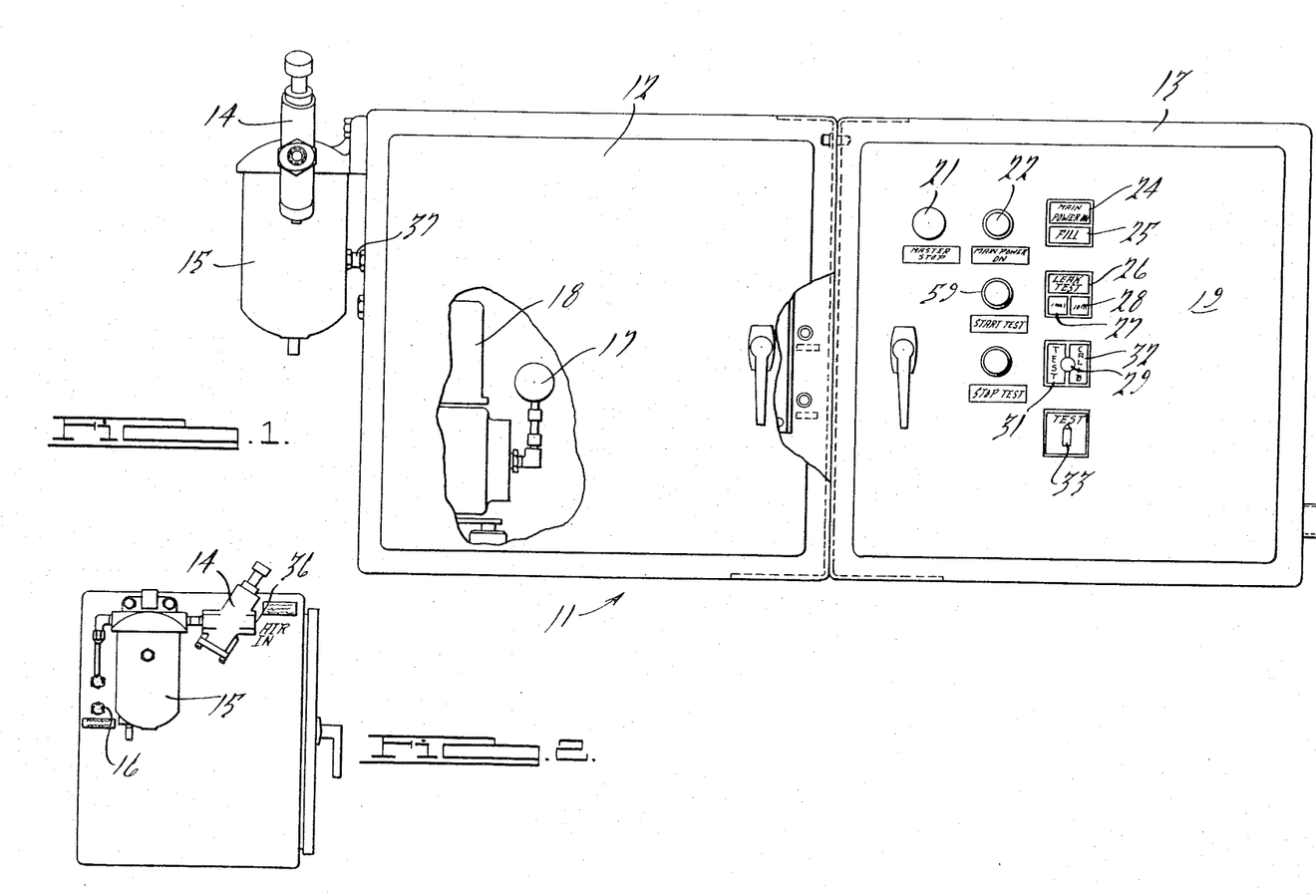
FIG. 1 is a front elevational view of one embodiment of the leak detection unit, mountable on a wall.
FIG. 2 is a side elevational view thereof.
Figure 2:
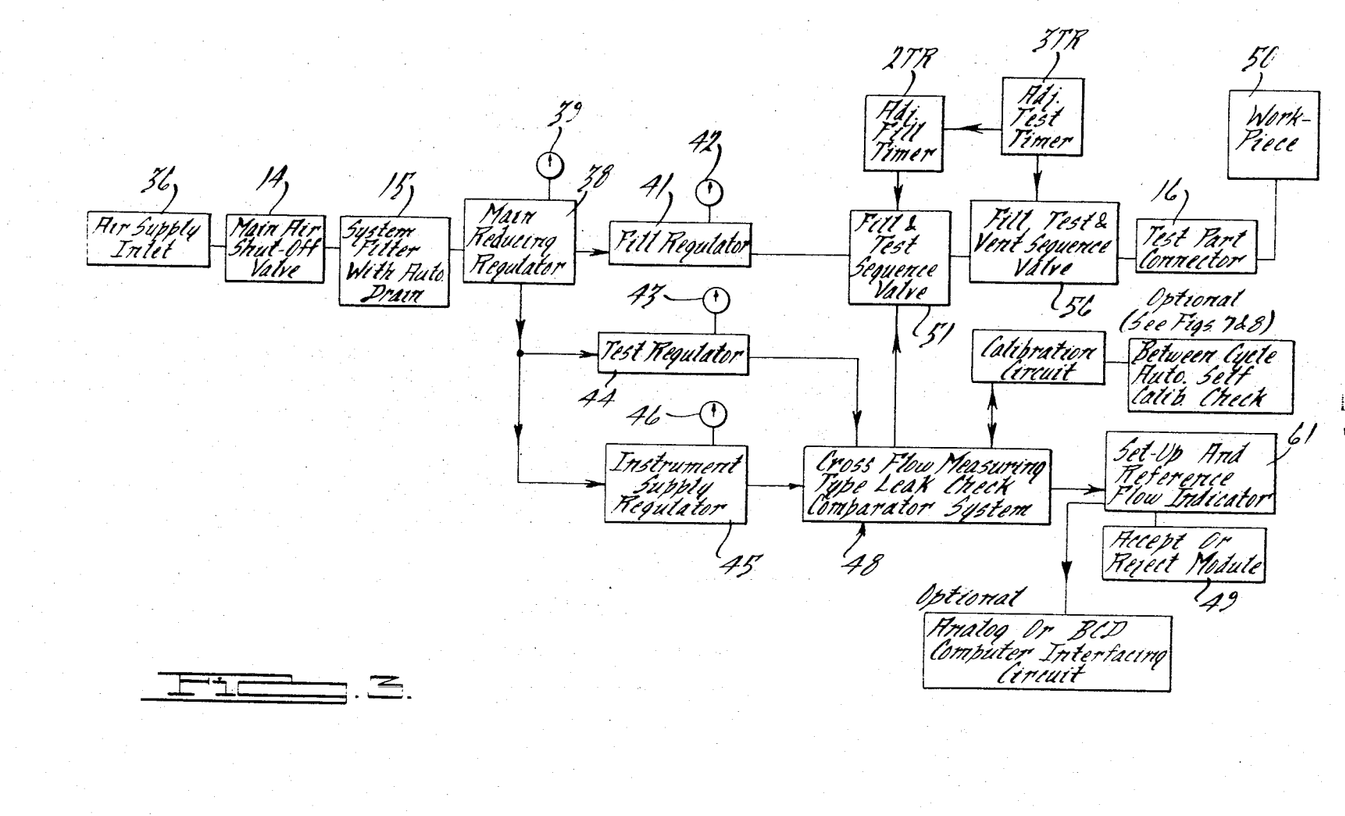

Referring first to the embodiment of FIGS. 1 to 5, the unit is generally indicated at 11 in FIG. 1 and comprises two wall mountable cabinets connected together, one cabinet enclosing the pneumatic module 12 and the other the electrical module 13. (Floor mountable cabinets could also be provided.) Portions of the pneumatic module are visible in FIGS. 1 and 2, such as a three-way shut-off valve 14, a filter 15 and a pneumatic test connection 16 all on one side of pneumatic module 12. Visible in the interior of this module is the laminar flow element 17 the function of which is described below. A differential pressure transmitter 18 is connected to element 17.

Figure 5:
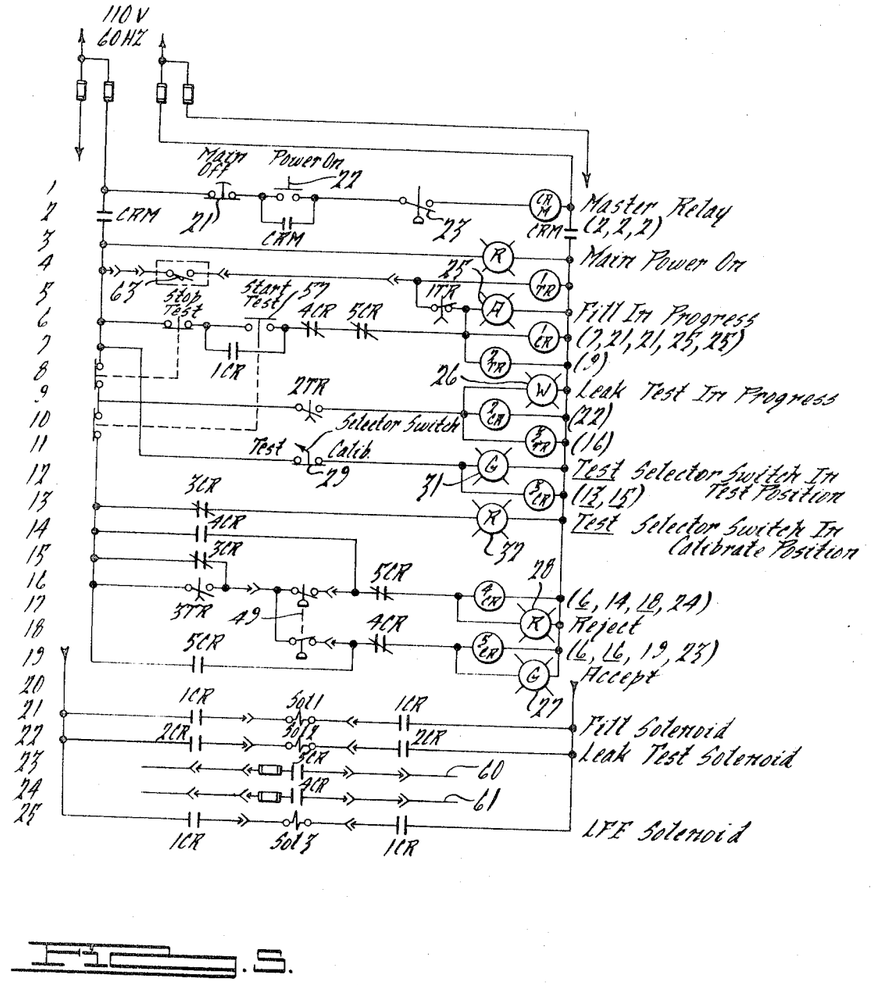
FIG. 5 is a schematic diagram of the electrical circuit.

The front panel 19 of electrical module 13 has a number of push button switches and indicator lights. A master stop switch 21 shuts off the main electrical power when open. This switch and a power-on switch 22 are in series with the CRM master relay as seen in FIG. 5, the circuit also including a normally open switch 23 which is responsive to application of full air pressure from the compressed air source. This will avoid a false "accept" reading with no air pressure being supplied, or with insufficient pressure because of a clogged filter 15.

A red main power-on light 24 indicates when electrical power and compressed air are available. An amber fill light 25 indicates that filling of the workpiece is in progress, whereas a white leak test light 26 shows that the leak test itself is progressing. A green accept light 27 and a red reject light 28 are disposed below light 26 to indicate acceptance or rejection of the workpiece.

A selector switch 29 is provided which when in test position will illuminate a green light 31 and in calibrate position a red light 32. When in test position, the leakage test will be conducted in a normal manner. The calibration position will bypass a portion of a normal test and enable the operator to conduct a test on the unit itself to determine its accuracy.

Figure 4:
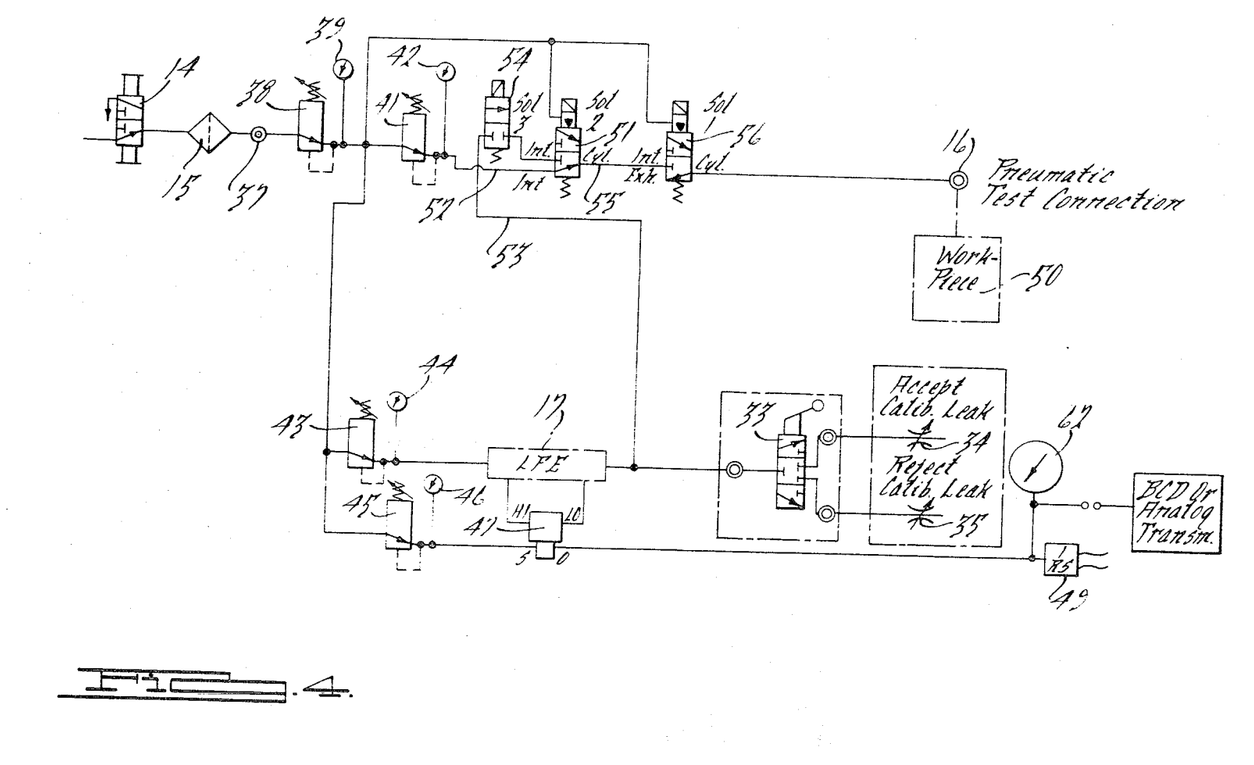
FIG. 4 is a schematic diagram of the pneumatic circuit.

A calibration simulator valve 33 is mounted below switch 29 and is also illustrated in FIG. 4. This valve is movable among three positions, a central closed position, and left and right-hand positions connecting the output of flow element 17 with either of two needle valves. These are indicated at 34 and 35 respectively in FIG. 4 and are adjusted to simulate either an acceptable or a rejectable leak respectively.

FIG. 3 is a schematic flow diagram of the system and can be understood in conjunction with FIGS. 4 and 5 showing the pneumatic and electrical systems respectively. An air supply inlet 36 leads to main air shut-off valve 14 at the outlet of which is system filter 15. The air then flows through a bulkhead fitting 37 to a main reducing regulator 38 and gauge 39 which reduces and regulates the main air pressure to a given value, say 60 psig. From there the air branches off in several directions. It is supplied to a fill regulator 41 and gauge 42, which regulate and indicate the pressure used to fill the test part. In a typical installation, this could be a pressure slightly in excess of 20 psig. Compressed air is also supplied to a test regulator 43 and gauge 44 supplying laminar flow element 17, and to an instrument supply regulator 45 and gauge 46 feeding a differential pressure transmitter 47. Laminar flow element 17 and transmitter 47 together form a cross-flow measuring type leak check comparator system indicated generally and schematically at 48 in FIG. 3. A suitable laminar flow element for use with the invention is manufactured by Meriam Instrument Co., Cleveland, Ohio, and a satisfactory differential pressure amplifier is made by Taylor Instrument Company, Rochester, New York. As seen in FIG. 4, the amplifier has connections to the inlet and outlet of element 17 and will instantaneously and continuously sense the pressure drop which is dependent upon the rate of flow. The output of amplifier 47 may, for example, vary between 3 and 15 psig. depending on the rate of flow through element 17 and will control the position of an accept/reject pressure switch 49, the switch being held in one position if the pressure is below a predetermined amount and in another position if it is above this amount.

The system contemplates an initial charge of compressed air to the workpiece (indicated schematically at 50) from regulator 41 and, after a timed interval, a compressed air supply from regulator 43 through laminar flow element 17, the pressure from regulator 43 being slightly less than that from regulator 41. This sequential filling and testing is controlled by a fill and test sequence valve 51 having two supplies, one through a line 52 from regulator 41 and the other through a line 53 from the output of element 17. A solenoid-operated flow shut-off valve 54 is placed in line 53 to prevent undesired flow surges after each test.

The outlet from valve 51 leads through a line 55 to the intake port of a fill, test and vent sequence valve 56 which in turn leads to connection 16 for workpiece 50. Valve 56 is shiftable between a first position supplying compressed air from valve 51 to the workpiece, and a second position exhausting the air from the workpiece.

The means for controlling the filling and testing time intervals comprise a fill timer 2TR and a test timer 3TR respectively. These are conventional solenoid-operated switches which close after an adjustable timer interval. Switch 2TR when closed will energize relay 2CR which will close the circuit to solenoid 2 controlling fill and test sequence valve 51. This will end the fill portion of the cycle during which the workpiece is charged and initiate the test portion, by shifting valve 51 from its upper position as shown in FIG. 4 to its lower position. Timing switch 3TR when closed will energize either relay 4CR or 5CR. This will open the circuit to relay 1CR (see line 6 in FIG. 5) which in turn will open the circuit to solenoid 1 controlling valve 56. Valve 56 will then return to its upper position as shown in FIG. 4, relieving the pressure in the workpiece.

To manually start a test, a push button 57 is depressed, closing the circuit to relay 1CR. This will close a holding contact and the circuit to solenoid 1, shifting valve 56 to its lower or supply position in FIG. 4. Valve 54 will also be shifted to its supply position. Pressurized air will immediately flow into workpiece 50, its pressure being controlled by regulator 41. Timing switch 2TR will close after a given interval, the setting of this switch being adjusted in accordance with the size of the workpiece and the time needed to bring it to a full charge.

Closure of timing switch 2TR will energize relay 2CR, thereby causing solenoid 2 to shift valve 51 to its lower position in FIG. 4. This will cut off pressure from regulator 41 and permit pressurized air from element 17 to be admitted to the workpiece. As stated previously, this pressure will be slightly lower than the pressure from regulator 41. Timing switch 3TR will also be initiated at this time and will close after a predetermined period. During this time, transmitter 47 will sense and amplify the pressure drop across element 17, this drop being proportional to the flow which in turn will vary with the amount of leakage in the workpiece. The amplified output signal, being for example a pressure of between 3 and 15 psig., will act on switch 49 as seen in lines 16 and 18 of FIG. 5. With the leakage in the acceptable range, closure of 3TR will cause 5CR to be energized, opening the circuit to 4CR and also opening the circuit in line 6 to de-energize relay 1CR and timing switch 2TR. Green light 27 will be illuminated and a bypass contact around switch 49 will maintain its illumination. Relay 5CR may also close contacts in separate circuit 60 which could control any other desired indicating, recording or actuating device.

Should the leakage be greater than the acceptable amount, switch 49 will be shifted to energize 4CR when 3TR closes. This will likewise open the circuit in line 6, de-energizing 1CR and opening switch 2TR. Red light 28 will be illuminated and additional circuit 61 enabled for an appropriate indicator, recorder or activator.

In addition to the red or green lamp signals, indicating the reject or accept mode, a flow indicator 62 (FIG. 4) may be provided which is connected to the output of amplifier 47.

With the de-energization of relay 1CR, valves 54 and 56 will be returned to their upper positions in FIG. 4. This will exhaust workpiece 50 and at the same time disconnect element 17 from the workpiece so that no surge will be apparent. Opening of timing switch 2TR will permit valve 51 to shift to its upper position, reconnecting line 55 with the operative pressure regulator 41 in readiness for the next test.

In automated assembly lines it may be desirable to test each workpiece automatically instead of manually. For this purpose a circuit shown in lines 4 and 5 is provided. This circuit includes a limit switch 63 which may be closed each time a part passes or reaches a certain location. This will energize relay 1CR and timing switch 2TR, initiating the fill and test portions of the cycle as described above. However, instead of 1CR being de-energized by 4CR or 5CR, it will be deactivated by the opening of 1TR after a timed interval chosen in accordance with the rate of movement of the workpiece.

At times it may be desirable to check whether the unit is properly measuring and indicating acceptable and rejectable leakage flow rates. To accomplish this, the selector switch 29 is moved from its test to its calibrate position in line 11 of FIG. 5. This will extinguish lamp 31 and de-energize relay 3CR, illuminating lamp 32. De-energization of 3CR will also enable both branches of switch 49. Valve 33 will then be manually shifted to connect either the accept orifice 34 or the reject orifice 35 to the output of element 17. As mentioned previously, orifice 34 will be slightly less than the acceptable leakage rate and orifice 35 slightly greater. Thus, the reject lamp 28 or the accept lamp 27 should be illuminated if the device is in order, depending on the position of valve 33.

Figure 6:
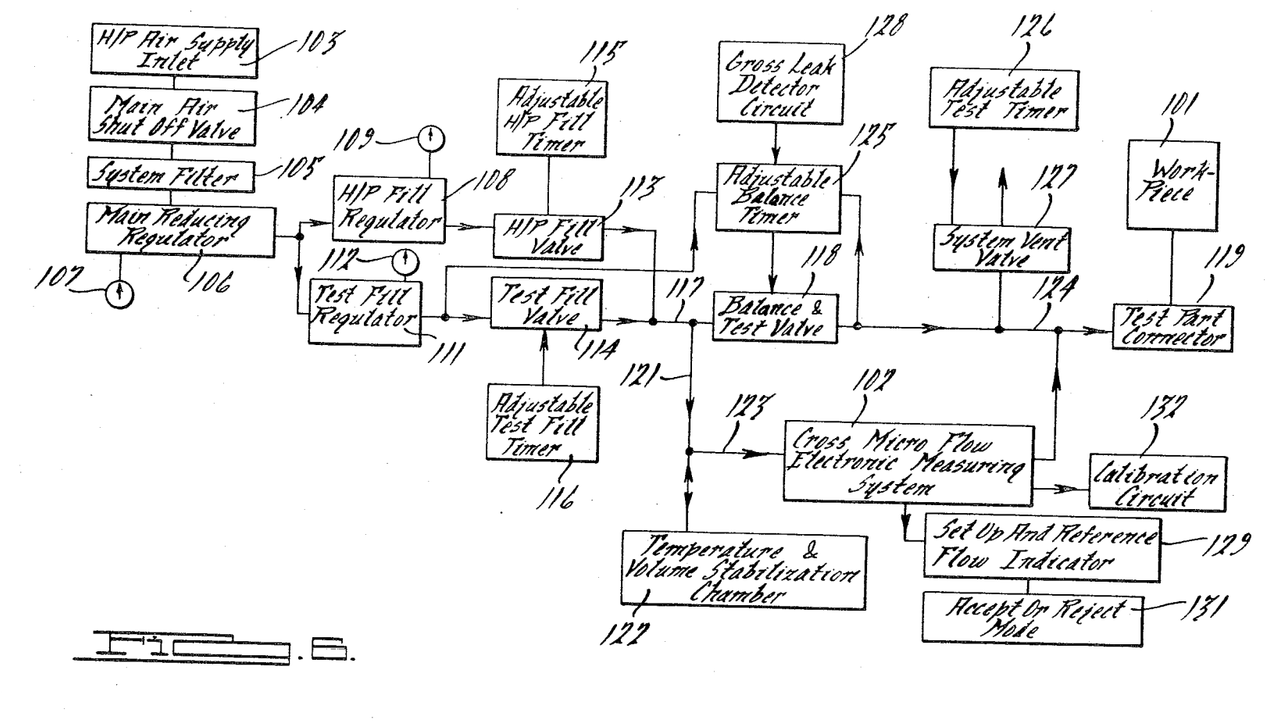
FIG. 6 is a flow diagram of another embodiment of the invention adapted to detect very small leaks.

FIG. 6 is a schematic flow diagram of a modified form of the invention suitable for detecting very small leakage flow rates. This embodiment incorporates the same basic principles as the previous one, such as the rapid pre-filling of the workpiece 101 to a predetermined pressure and the subsequent measurement of leakage by a flowmeter 102, in this instance a microflow electronic measuring system such as one including a differential pressure transmitter which detects and amplifies the output of the flowmeter to give a flow signal.

The system includes a high pressure air supply inlet 103. This leads through a main air shut-off valve 104 in a system filter 105 to a main reducing regulator and gauge 106, 107. Regulator 106 is connected to both a high pressure fill regulator 108 having a gauge 109 and a test fill regulator 111 having a gauge 112. In a typical installation, regulator 108 may be set to have an output of about 400 psig. and regulator 111 about 350 psig. The higher pressures used as compared with the previous embodiment would enable the unit to detect relatively small leaks.

Regulators 108 and 111 are connected to a high pressure fill valve 113 and a test fill valve 114 respectively. The opening and closing of valve 113 is controlled by an adjustable high pressure fill timer 115, and valve 114 is controlled by an adjustable test fill timer 116.

The outlets of these valves lead through a line 117 and a balance and test valve 118 to a test part connector 119 to which workpiece 101 is connected. A branch 121 from line 117 leads to a temperature and volume stabilization chamber 122 the purpose of which will appear below. A conduit 123 leads from this chamber to the line 124 connecting valve 118 and connector 119. Cross micro-flow electronic measuring system 102 is placed in this branch. As mentioned previously, this system includes a flow-meter and a differential pressure transmitter which detects and amplifies its output to give a flow signal. Such a transmitter is manufactured by Rosemont Engineering Co., Minneapolis, Minnesota.

An adjustable balance timer 125 is connected to balance and test valve 118, and a test timer 126 controls a system vent valve 127 leading from line 124. These timers control the operation of the system in a manner about to be described. A gross leak detector circuit 128 is connected across test fill valve 114 and balance and test valve 118. This detector may be a conventional differential pressure type which is capable of detecting relatively large leakage rates.

In operation of the embodiment of FIG. 6, balance and test valve 118 will initially be open. High pressure fill valve 113 will be opened by timer 115, permitting high pressure air to flow both to workpiece 101 and to chamber 122. After a predetermined time this valve will be closed and test fill valve 114 will be opened to bring both the workpiece and chamber 122 to a stable pressure. It should be noted that any temperature changes in the workpiece or chamber 122 caused by the change in pressures will be equal, thereby nullifying any inaccuracy due to temperature effects.

Gross leak detector circuit 128 will at this point be operated by brief closure of valve 114 to see if there are any large leaks in the workpiece. If so, the balance of the test will be omitted. If there are no such leaks, valve 114 will be opened and balance and test valve 118 closed, so that any leakage in workpiece 101 will be detected by cross micro-flow electronic measurement system 102. Because of the completely balanced condition which obtains before measuring system 102 is connected between chamber 122 and the workpiece, the system will detect extremely small leakage rates in a rapid and accurate manner. As in the previous embodiment, the output from this system may be connected to a setup and reference flow indicator 129 and an accept or reject mode 131. A calibration circuit 132 may also be connected to system 102 if desired.

Figures 7, 8:
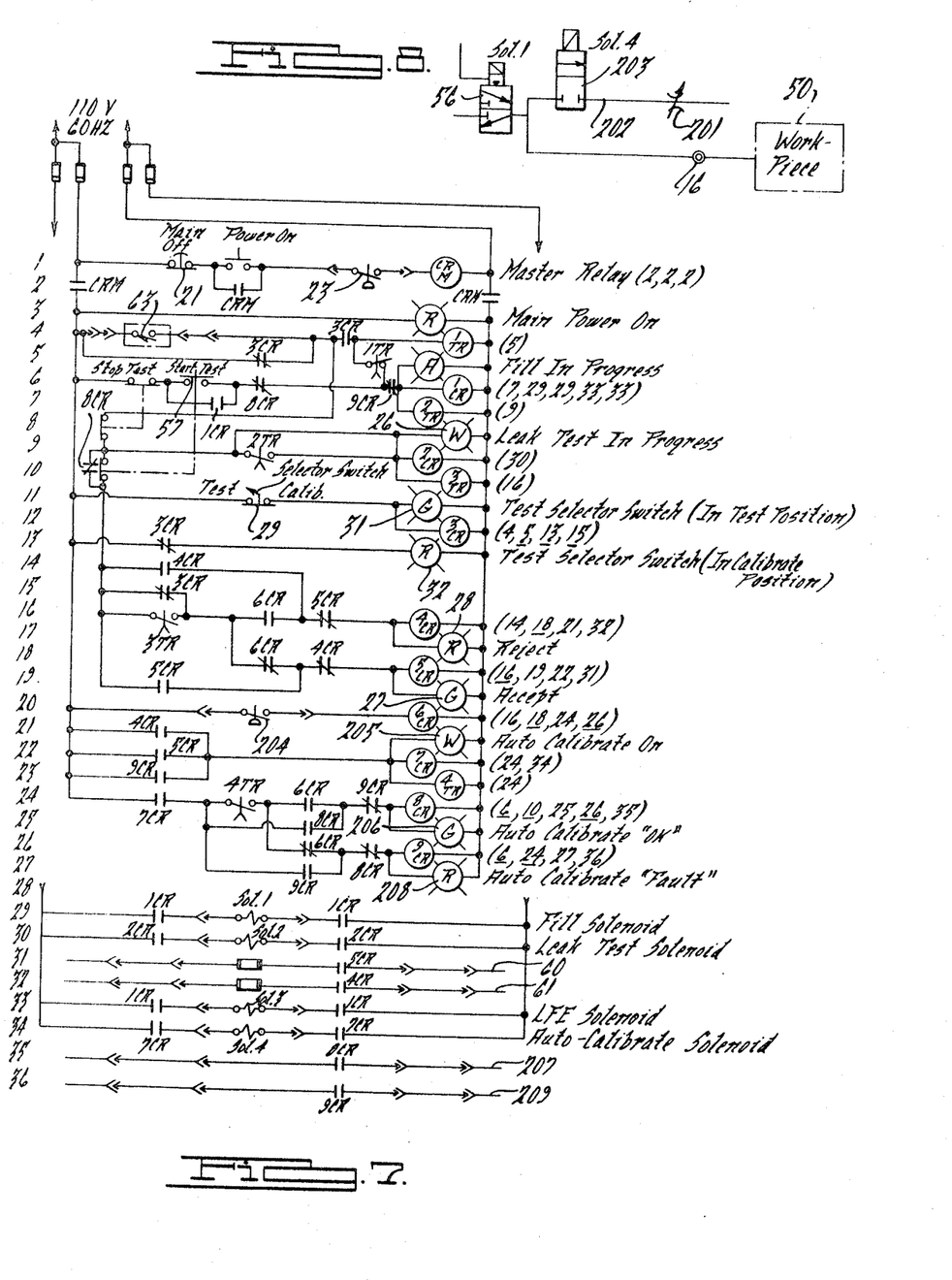
FIG. 7 is an electrical circuit diagram of a third embodiment of the invention incorporating automatic calibration check.
FIG. 8 is a portion of the pneumatic diagram of this embodiment.
Figure 7:
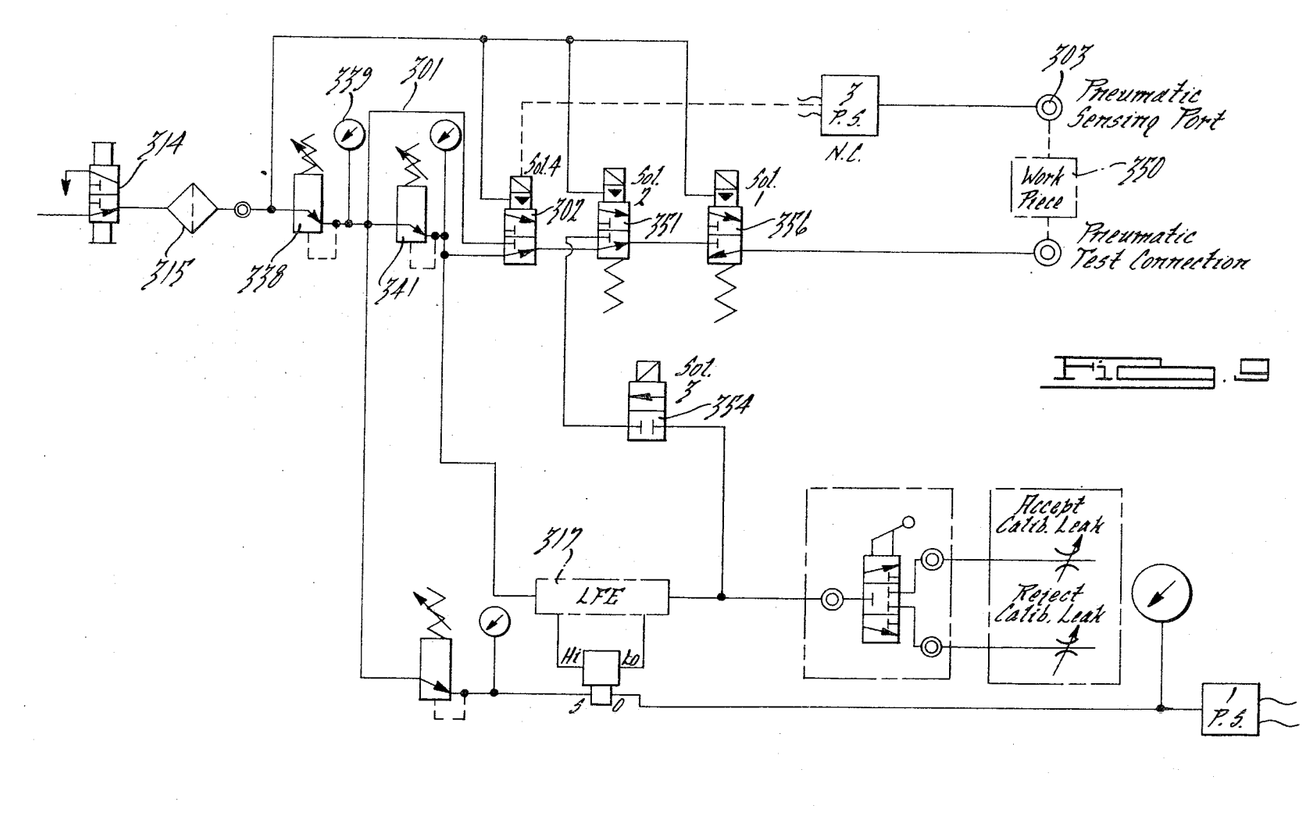

FIGS. 7 and 8 illustrate a third embodiment of the invention which is similar to that shown in FIGS. 1–5 but adds means for automatically checking the unit after each workpiece has been tested to see whether it is functioning properly. This automatic calibration means takes the form of an adjustable orifice 201 connected to the output of fill, test and vent sequence valve 56 in parallel with test part connector 16. The branch 202 leading to orifice 201 passes through a normally closed solenoid-operated two-way valve 203. The arrangement is such that upon completion of the leakage test on each workpiece 50, instead of the unit being re-enabled for testing the next workpiece, valve 203 will be opened to connect the outlet of valve 56 to orifice 201. This orifice will be set just slightly wider than the maximum acceptable leakage rate. At the end of a predetermined time interval, the circuit will be automatically checked to see if the unit has properly sensed the leakage rate as being greater than acceptable. If so, an auto-calibrate "O.K." signal will be made and the circuit re-enabled for the next workpiece. If not, an auto-calibrate "fault" signal will be energized and the unit will be shut down so that it cannot be re-enabled until the fault is corrected.

FIG. 7 shows the electrical circuit diagram for the auto-calibrate modification. The main portion of this diagram is similar to FIG. 5 and its operation need not be redescribed, it sufficing to say that the start, fill and test portions of the cycle will be carried out as previously.

To describe the operation of the embodiment of FIGS. 7 and 8 as it pertains to auto-calibrate, let us start at the point where test timing switch 3TR closes. Transmitter 47 will have been sensing and amplifying the pressure drop across element 17. The amplified output signal will act on a switch 204 which is a normally open pressure-actuated switch. Regardless of whether leakage of workpiece 50 is in the acceptable or rejectable range (switch 204 closed or open), closure of 3TR will energize either 4CR or 5CR, energizing a white "auto-calibrate on" lamp 205, relay 7CR and normally open time delayed switch 4TR. Energization of 7CR will enable line 24 and energize solenoid 4 in line 34 which shifts auto-calibrate valve 203 to its open position. Valve 56 will thus be connected with orifice 201.

At the end of the time interval controlled by timing switch 4TR, the switch will close. During this time interval, pressure-sensitive switch 204 will respond to the amplified output signal from transmitter 47. If the unit is functioning properly switch 204 will close, energizing 6CR. Thus, closure of 4TR will energize 8CR in line 24. Auto-calibrate "O.K." lamp 206 will also be energized. In addition to closing bypass contacts for 4TR in line 25 and opening the circuits for 9CR in line 26, 8CR will open contacts in lines 6 and 10, resulting in the entire unit being re-enabled for testing the next workpiece. An additional circuit 207 in line 35 may be provided for any other desired purpose such as a signal or actuator with respect to parts moving along an assembly line.

Should the unit be faulty to such an extent that pressure-sensitive switch 204 fails to close after valve 203 has been opened, closure of 4TR will energize 9CR and auto-calibrate "fault" lamp 208. Contacts 9CR in line 6 will open to shift valve 56 to its exhaust position by the de-energization of 1CR. 8CR will be disconnected and 4TR bypassed so that 9CR remains energized and the unit will be unable to test further workpieces until it is manually reset and the fault corrected. An additional signal or actuator line 209 may be provided which is controlled by energization of 9CR.

It will be observed that the arrangement provides for the automatic calibration either after manually initiated workpiece tests or tests controlled by limit switch 63. Moreover, the unit can be switched to manual calibration by shifting switch 29 to the "calibrate" position. This will de-energize 3CR and enable switch 204. Valve 33 may then be manually shifted as described above with respect to the first embodiment, to check the unit with either accept orifice 34 or reject orifice 35.

FIG. 9 illustrates another modification of the invention which is basically similar to that of FIGS. 1 through 5 but provides means for initially pre-filling the workpiece at a much faster rate and completing the pre-filling with the same pressure regulator used for testing. The rapid pre-fill has the advantage of reducing the thermal effect which accompanies the pressurizing of a workpiece, this effect being less with more rapid pre-filling. When a workpiece is being pressurized, the temperature of the air within the part increases because of the increased pressure. The air then tends to cool due to the surrounding surfaces of the workpiece. With certain parts, this cooling effect could cause a slightly higher flow rate through the flowmeter indicating a false leakage reading. It has been found that rapid pre-filling of the workpiece will minimize this effect and result in quicker leakage measurement without obtaining false flow readings. On larger parts there is a substantial cycle time saving with this arrangement.

Many of the parts shown in FIG. 9 are duplicates of those shown in FIG. 4 and these components bear the same reference numerals as in FIG. 4 except that 300 has been added. Parts 301, 302 and 303 are however unique to FIG. 9.

A bypass 301 is connected between the outlet of main reducing regulator 338 and fill and test sequence valve 351, with a bypass control valve 302 inserted in line 301. Valve 302 is controlled by solenoid 4 which in turn is controlled by a normally closed switch 3PS. This switch is movable to its open position in response to pressure at a pneumatic sensing port 303 connected to the interior of workpiece 350. When port 303 senses the attainment of a predetermined pressure switch 3PS will open and valve 302 will move from a lower position in which bypass 301 is connected to the inlet of valve 351 to an upper position as shown in FIG. 9. In the latter position bypass 301 is closed and the pre-fill air is fed to valve 351 through a regulator 341. This regulator supplies air both to the remainder of the pre-fill phase of the operation and also to laminar flow element 317.

In operation of the embodiment of FIG. 9, with valve 356 in its lower or supply position and valve 354 also in its supply position, pressurized air will immediately flow into workpiece 350 from regulator 338, through bypass 301 and valve 302, then through valves 351 and 356. As mentioned above with respect to main reducing regulator 38, this main air pressure could be at a value of say 60 psig. The result will be that part 350 fills very rapidly with air. When it reaches a pressure approximately that to which regulator 341 is set, say 10 psig, sensing port 303 will cause switch 3PS to open, energizing solenoid 4 and shifting valve 302 upwardly. This will close the bypass and the remainder of the pre-fill step will be through regulator 341, set at perhaps 10 psig. Timing switch 2TR will close after a given interval, causing solenoid 2 to shift valve 351 to its lower position. This will cut off pressure from valve 302 and permit pressurized air from element 317 to be admitted to the workpiece. As indicated above, this pressure will be controlled by the same regulator 341 which control the last portion of the pre-fill cycle. Thus, a situation which could arise in certain instances should the air pressure supply be cut off and then re-established will be avoided. That is, any possible lack of synchronism between two pressure regulators (such as regulators 41 and 43 of the first embodiment) due to disconnection and reconnection of the air pressure is impossible. The remainder of the cycle will be the same as the first embodiment.

Regulator 341 should be a high accuracy precision type regulator because of the very fine pressure control required for proper functioning of the system. Ordinarily, pressure regulator 338 will have relatively high flow capacity, and it is a characteristic of such regulators to have an accuracy which is not as fine as those with lower flow capacities. Therefore, regulator 338 will serve the purpose of rapidly charging the workpiece but the final portion of the pre-filling step will take place through the more accurate regulator 341.

The use of timing devices rather than pressure-responsive means for the sequential steps of filling and testing, in all the disclosed embodiments, has the advantage of giving the system flexibility and versatility. In situations where extremely accurate leakage measurements are required, the timing means can be set to assure that pressure instabilities due to the thermal effect of pressurizing and the subsequent cooling effect will be minimized, without having to rely on pressure sensing devices which may not be able to take into account such instabilities. On the other hand, in cases where high production rates are involved and extreme accuracy is not as important, the timing means could be set to switch from the pre-fill to the test portions of the cycle even before complete pressurization of the part has taken place. Because timing devices can be set with extreme accuracy, it is possible by precalibration to determine exactly the dynamic or static pressure characteristics at critical points of the cycle.

We claim:

1. In a leak detector unit, means for rapidly pre-filling a workpiece for a predetermined time, means maintaining a test pressure after pre-filling has been accomplished, a flowmeter detecting the flow rate to said workpiece while maintaining said test pressure, said pre-filling means including a fill regulator, a fill and test sequence valve connected between said fill regulator and flowmeter and said workpiece, an adjustable fill timer moving said valve from a first position connecting said fill regulator to said workpiece to a second position connecting said flowmeter to said workpiece, a fill, test and vent sequence valve between said fill and test sequence valve and said workpiece, and an adjustable test timer activatable by said fill timer for shifting said fill, test and vent sequence valve from a first position connecting said fill and test sequence valve to said workpiece to a second position venting said workpiece, whereby said workpiece will be pre-filled until said fill timer shifts the fill and test sequence valve and will thereafter be tested until said test timer shifts the fill, test and vent sequence valve.

2. The combination according to claim 1, further provided with means responsive to timing out of said test timer for shifting said fill and test sequence valve back to its first position.

3. The combination according to claim 2, further provided with a separate valve between said flowmeter and said fill and test sequence valve responsive to timing out of said test timer to disconnect said flowmeter from the workpiece being vented.

4. In a leak detector unit, means for rapidly pre-filling a workpiece for a predetermined time, means maintaining a test pressure after pre-filling has been accomplished, a flowmeter detecting the flow rate to said workpiece while maintaining said test pressure, said flowmeter comprising a laminar flow element and a differential pressure transmitter connected thereto, and a pressure-sensitive switch movable in response to the output from said transmitter to indicate acceptance or rejection of the workpiece.

5. The combination according to claim 4, said acceptance and rejection indicating means further comprising two lamps, and means responsive to the shifting of said pressure-sensitive switch to illuminate either lamp and to return said pre-filling and pressure maintenance means to their normal position in readiness for the next test.

6. The combination according to claim 4, said pre-filling means comprising a fill regulator connected to a fill and test sequence valve, said pressure maintenance means comprising a test regulator connected to said laminar flow element, the output of the laminar flow element being connected to said fill and test sequence valve, said valve being shiftable between a first position in which the fill regulator is connected to a workpiece and a second position in which the laminar flow element is connected to the workpiece.

7. The combination according to claim 6, further provided with a fill, test and vent sequence valve located between said fill and test sequence valve and said workpiece, said fill, test and vent sequence valve being shiftable between a first position permitting flow from said fill and test sequence valve to said workpiece and a second position venting said workpiece.

8. In a leak detector unit, means for rapidly pre-filling a workpiece for a predetermined time, means maintaining a test pressure after pre-filling has been accomplished, a flowmeter detecting the flow rate to said workpiece while maintaining said test pressure, said means for maintaining the pressure supply to said workpiece comprising a stabilization chamber, means connecting said pre-filling means to said stabilization chamber whereby the chamber and workpiece are simultaneously pre-filled, and a connection between said stabilization chamber and workpiece including said flowmeter.

9. The combination according to claim 8, further provided with a balance and test valve connected between said stabilization chamber and workpiece, and an adjustable balance timer connected to said last-mentioned valve to close the valve after a predetermined time whereby the connection between said stabilization chamber and workpiece will be through said flowmeter.

10. The combination according to claim 9, further provided with a system vent valve, and an adjustable test timer opening said valve after a predetermined time to vent the workpiece.

11. The combination according to claim 9, further provided with a high pressure fill valve, and means filling the chamber and workpiece with high pressure before connecting said test pressure thereto, said test pressure being slightly lower than said high pressure fill.

12. The combination according to claim 9, further provided with a gross leak detector circuit connected across said balance and test valve and a test fill valve in series therewith, and means closing said test fill valve and thereby enabling said gross leak detector circuit after pre-filling of said chamber and workpiece but before closing of said balance and test valve, whereby relatively large leaks in the workpiece will be detected.

13. In a leak detector unit, means for rapidly pre-filling a workpiece for a predetermined time, means maintaining a test pressure after pre-filling has been accomplished, a flowmeter detecting the flow rate to said workpiece while maintaining said test pressure, a calibration circuit connected to the output of said flow detecting means, said calibration circuit comprising adjustable orifices for preselecting an acceptable and rejectable calibration leak, and valve means for connecting either of said orifices to the output of said flowmeter.

14. In a leak detector unit, means for rapidly pre-filling a workpiece for a predetermined time, means maintaining a test pressure after pre-filling has been accomplished, a flowmeter detecting the flow rate to said workpiece while maintaining said test pressure, means responsive to the positioning of a workpiece at a predetermined location for activating said pre-filling means, and timing means responsive to activation of said pre-filling means for sequentially activating said pressure maintenance means and flowmeter and thereafter venting said workpiece and returning the system to its initial condition.

15. In a leak detector unit, means for rapidly pre-filling a workpiece for a predetermined time, means maintaining a test pressure after pre-filling has been accomplished, a flowmeter detecting the flow rate to said workpiece while maintaining said test pressure, timing means controlling the duration of said pre-filling and test pressures and thereafter automatically connecting the output of said flowmeter to a fixed orifice set to a non-acceptable leakage rate, means permitting flow through said orifice for a predetermined time, means signaling the detection by said flowmeter of said non-acceptable orifice leakage rate, and means responsive to the failure of said last-mentioned means to disenable the leak detector unit.

16. The combination according to claim 15, said means for detecting the non-acceptable leakage rate of said orifice comprising a pressure-sensitive switch, said means for disenabling the unit comprising relay means actuatable after said given time interval only if said pressure-sensitive switch has been actuated.

17. The combination according to claim 16, said pre-filling means including a fill regulator, said test pressure means including a test regulator connected to said flowmeter, a fill and test sequence valve connected between said fill regulator and flowmeter and said workpiece, said timing means comprising an adjustable fill timer moving said valve from a first position connecting said fill regulator to said workpiece to a second position connecting said flowmeter to said workpiece.

18. The combination according to claim 17, further provided with a fill, test and vent sequence valve between said fill and test sequence valve and said workpiece, said timing means further comprising an adjustable test timer activatable by said fill timer for shifting said fill, test and vent sequence valve from a first position connecting said fill and test sequence valve to said workpiece to a second position venting said workpiece, whereby said workpiece will be pre-filled until said fill timer shifts the fill and test sequence valve and will thereafter be tested until said test timer shifts the fill, test and vent sequence valve.

19. The combination according to claim 15, further provided with means responsive to said last-mentioned detection for re-enabling said unit for testing another workpiece.

20. The combination according to claim 19, further provided with means signaling acceptable or rejectable leakage rates in each workpiece and detection or non-detection of said orifice leakage rate by said unit.

21. In a leak detector unit, means for rapidly pre-filling a workpiece for a predetermined time, means maintaining a test pressure after pre-filling has been accomplished, a flowmeter detecting the flow rate to said workpiece while maintaining said test pressure, said pre-filling means including a first pressure regulator, said pressure maintenance means comprising a second pressure regulator, said first regulator being set at a substantially higher pressure than said second regulator, a connection from the outlet of said first regulator to the inlet of said second regulator, a bypass from the outlet of said first regulator around said second regulator to said workpiece, whereby the workpiece will be initially pre-filled at a much higher pressure rate, and pressure-responsive means connected to the workpiece interior for closing said bypass whereby the final portion of the pre-filling step and the testing step will be through said second regulator.

22. In a leak detector unit, a source of compressed air, a pneumatic test connection for a workpiece, a flowmeter, a first pressure regulator set at a substantially higher pressure than the pressure at which the workpiece is to be tested, a second pressure regulator set at the test pressure, means for initially feeding air from said source to said test connection through said first regulator or whereby the workpiece will be at least partially charged at a rate so rapid as to minimize the temperature effect of pressurization, means responsive to the attainment of a pressure in said workpiece no greater than approximately said test pressure for switching said test connection supply to go through said second regulator, and timing means for switching the air supply from said second regulator to pass through said flowmeter, whereby the flow rate to said workpiece will be detected.

23. The combination according to claim 22, said two regulators being in series, and a bypass from said first regulator around said second regulator, said pressure-responsive means comprising a pneumatic sensing port and a valve in said bypass shiftable in response to a predetermined pressure increase at said sensing port.

* * * * *